United States Patent [19]

Adams et al.

[11] Patent Number: 4,875,644
[45] Date of Patent: Oct. 24, 1989

[54] ELECTRO-REPULSIVE SEPARATION SYSTEM FOR DEICING

[75] Inventors: Lowell J. Adams, North Canton; Steven C. Simshauser, Akron; Nathan Pisarski, Stow; Norbert A. Weisend, Jr., Cuyahoga Falls, all of Ohio

[73] Assignee: The B. F. Goodrich Company, Akron, Ohio

[21] Appl. No.: 258,279

[22] Filed: Oct. 14, 1988

[51] Int. Cl.$^4$ .............................................. B64D 15/00
[52] U.S. Cl. ............................. 244/134 R; 244/134 D
[58] Field of Search ........... 244/134 R, 134 D, 134 A

[56] References Cited

U.S. PATENT DOCUMENTS

| | | | |
|---|---|---|---|
| 2,599,059 | 6/1952 | Jones | 244/134 D |
| 3,549,964 | 3/1968 | Levin et al. | 317/262 |
| 3,672,610 | 6/1972 | Levin | 244/134 |
| 3,779,488 | 12/1973 | Levin | 244/134 |
| 3,809,341 | 5/1974 | Levin et al. | 244/134 R |
| 4,399,967 | 8/1983 | Sandorff | 244/134 |
| 4,494,715 | 1/1985 | Weisend, Jr. | 244/134 |
| 4,545,553 | 10/1985 | Finke et al. | 244/134 D |
| 4,561,613 | 12/1985 | Weisend, Jr. | 244/134 |
| 4,678,144 | 7/1987 | Goehner et al. | 244/134 R |
| 4,690,353 | 9/1987 | Haslim et al. | 244/134 D |
| 4,706,911 | 11/1987 | Briscoe et al. | 244/134 |
| 4,732,351 | 3/1988 | Bird | 244/134 R |
| 4,747,575 | 5/1988 | Putt et al. | 251/30.02 |
| 4,775,118 | 10/1988 | Daniels | 244/134 D |

Primary Examiner—Joseph F. Peters, Jr.
Assistant Examiner—Anne Sartelle
Attorney, Agent, or Firm—David M. Ronyak

[57] ABSTRACT

An electroexpulsive separation apparatus suitable for deicing of the leading edges of aircraft includes a pair of sheet-like arrays each containing in spaced-apart relationship a plurality of parallel ribbon-shaped electrically conductive members. The electrically conductive members are electrically interconnected such that any electrical current flowing in the conductive members flows in the same direction in adjacent electrically conductive members in the first sheet like member and also flows in adjacent electrically conductive members of the second sheet-like array in a direction opposite. The first and second sheet-like arrays are coextensive and superposed proximate to each other such that the electrically conductive members of the first and second sheet-like members are substantially parallel. The electrically conductive members are electrically insulated from one another. Large current pulses of predetermined magnitude, shape and duration are fed to the conductors from a power storage unit resulting in rapid and forceful separation of the first and second sheet-like arrays and other members associated therewith. The separation force for a given conductor, physical arrangement and current pulse is much greater than that of prior known devices.

75 Claims, 13 Drawing Sheets

DIELECTRIC SEPERATION

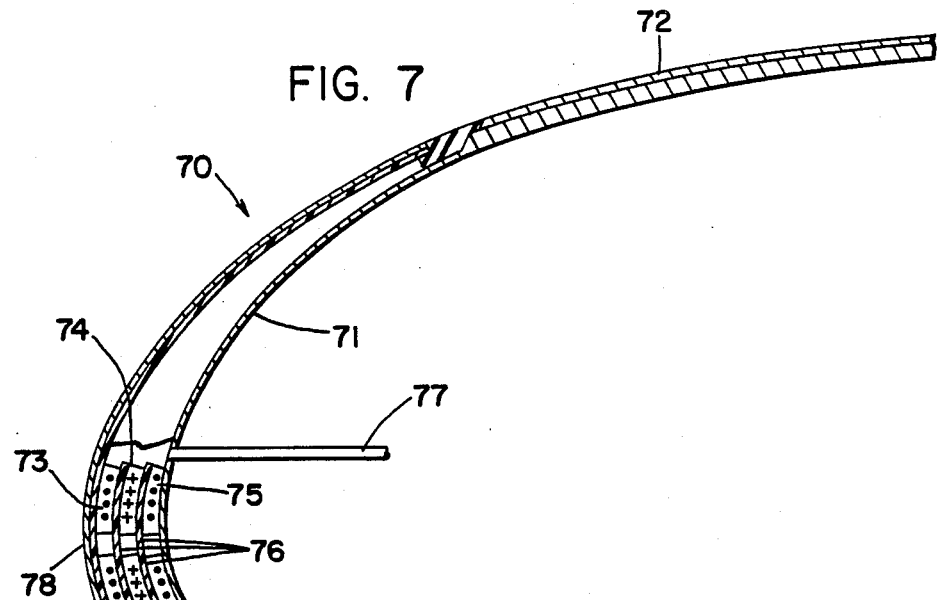
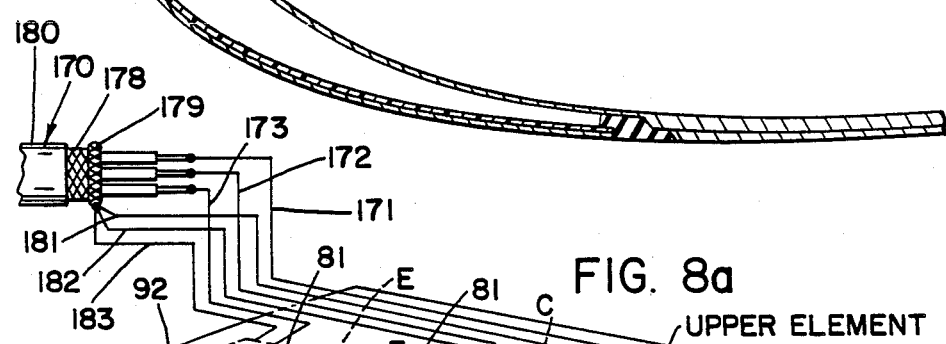
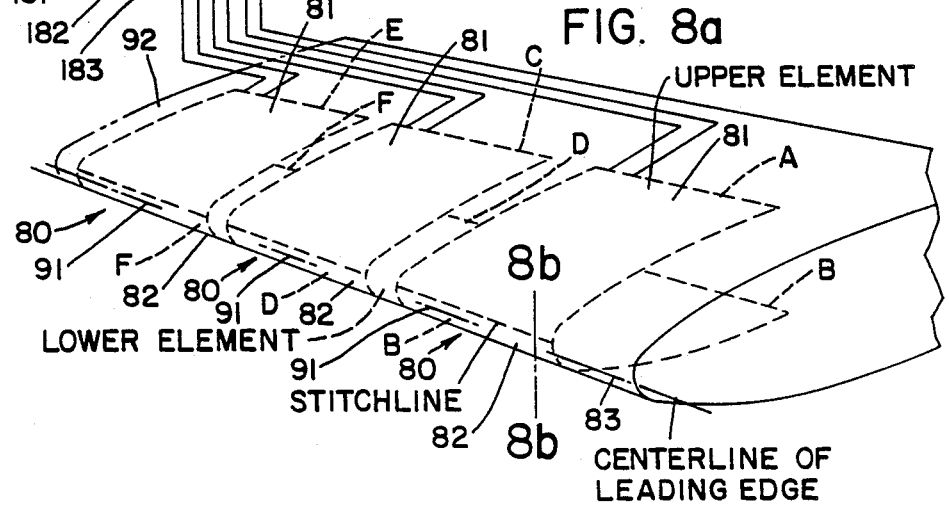
FIG. 7
FIG. 8a

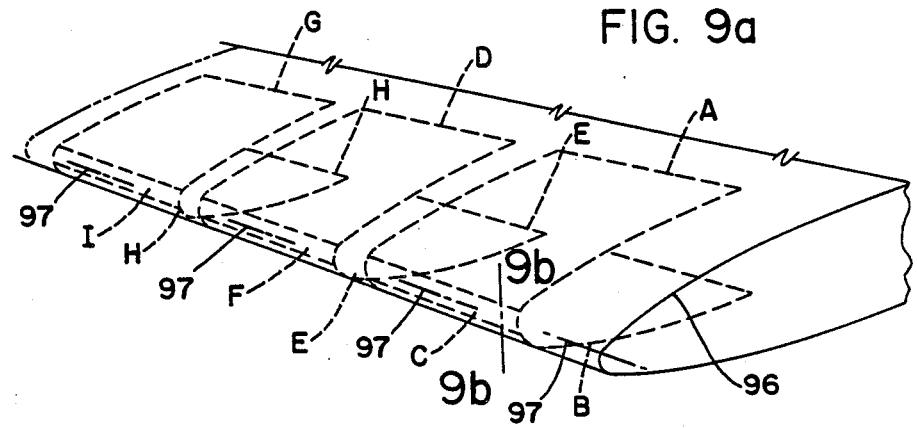
FIG. 9a
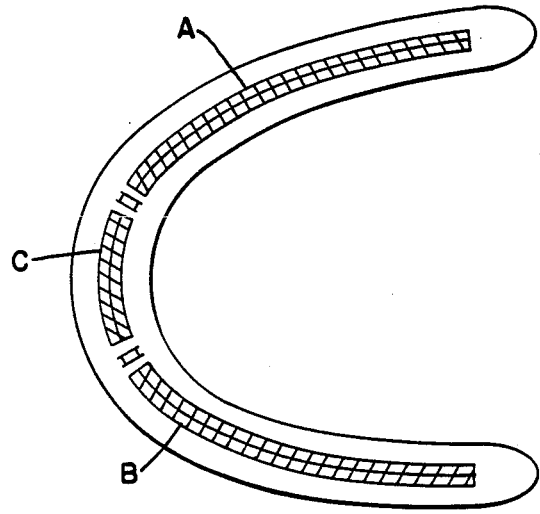
FIG. 9b
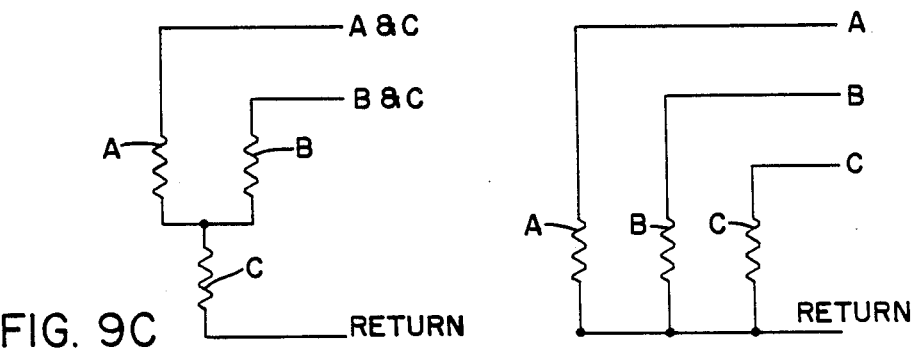
FIG. 9C
FIG. 9D

ELECTRO-REPULSIVE SEPARATION SYSTEM FOR DEICING

This invention relates to a system for separating a solid body such as a layer of ice from the surface of a resilient member. More particularly, this invention relates to deicing of aircraft leading edge surfaces such as are associated with nacelles, wings, struts, stabilizers, rotor blades and propellers. Specifically, this invention relates to electrically activated deicers for use on leading edges.

BACKGROUND OF THE INVENTION

Under certain operating conditions aircraft are vulnerable to accumulation of ice on components' surfaces. If unchecked such accumulations can eventually so laden the aircraft with additional weight and so alter the airfoil configuration of the wings as to cause an unflyable condition. Particularly vulnerable are low altitude, slow flying aircraft such as helicopters and tilt rotor aircraft. While a wide variety of systems have been proposed for removing ice from aircraft during flight or for preventing its accumulation on the leading edge surfaces of such aircraft, these prior art techniques can be placed into one of three general categories: thermal, chemical and mechanical.

Generally the first technique is known as thermal deicing. In one form the leading edges, that is, the edges of an aircraft component on which ice accretes and is impinged upon by the air flowing over the aircraft and having a point or line at which this air flow stagnates, are heated to loosen the accumulating ice from the aircraft. The loosened ice is blown from the aircraft component by the air stream passing over the aircraft. Heating is accomplished by placing a heating element in the leading edge zone of the aircraft component either by inclusion in a rubber boot or pad applied over the leading edge or by incorporation into the skin structure of the aircraft component. Electrical energy for the heating element is derived from a generating source driven by one or more of the aircraft engines. The electrical energy is switched on and off to provide heat sufficient to loosen accumulating ice. In another heating approach gases at elevated temperature from one or more compression stages of a turbine engine are conducted through passages and permitted to exit through the leading edges of components in order to prevent ice accumulation in the first instance or to heat accumulated ice to loosen the adhesive forces between it and the aircraft component. This latter system is often referred to as "bleed air" deicing. Both of these approaches require a considerable amount of power. The so-called bleed air systems result in reduced fuel economy and lower turbine engine power output available for thrust of the plane.

Generally the second approach is to apply a chemical to all or part of the aircraft to depress adhesion of ice to the aircraft or to depress the freezing point of water collecting upon surfaces of the aircraft.

The third commonly employed approach for deicing is generally termed mechanical deicing. The principal commercial mechanical deicing means employs a plurality of expandable generally tubelike structures which are inflatable employing a pressurized fluid, typically air. Upon inflation these tubular structures expand the leading edge profile of the wing or strut to crack ice accumulating thereon for dispersal into the air stream passing over the aircraft component. Exemplary of these structures are those described in U.S. Pat. Nos. 4,494,715 and 4,561,613 to Weisend, Jr. in which the pneumatic deicers are formed of compounds having rubbery or substantially elastic properties. Inflation of these tubes results in their expansion or stretching by 40% or more. The time for inflating such tubes typically averages between 2 and 6 seconds and results in a substantial change in profile of the deicer, as well as the leading edge, thereby cracking ice accumulating on the leading edge.

A more recently developed approach to pneumatic mechanical deicing is described in U.S. Pat. Nos. 4,706,911 to Briscoe et al. and 4,747,575 to Putt et al. Such deicers include a sheet-like skin having a substantially elevated modulus, a support surface positioned obversely with respect to the ice accreting surface, and one or more inflation tubes positioned between the support surface and skin. The inflation tubes are configured for inflation to an extent sufficient to deform the skin to a degree sufficient to dislodge ice accumulations upon the ice accreting surface without exceeding the stress endurance limit for the material from which the skin is formed.

Another subcategory of mechanical deicing includes those techniques that utilize internal "hammers" to distort the leading edge of the wing, as exemplified by U.S. Pat. No. 3,549,964 to Levin, wherein electrical pulses from a pulse generator are routed to a coil of a spark-gap pressure transducer adjacent the inner wall of the airfoil. The primary current in the coil induces a current in the wall of the airfoil and the magnetic fields produced by the currents interact so as to deform the airfoil wall. U.S. Pat. Nos. 3,672,610 and 3,779,488 to Levin; and 4,399,967 to Sandorff disclose aircraft deicers that utilize energized induction coils to vibrate or torque the skin on which ice forms. Each of these disclose electromagnetic coils or magneto restrictive vibrators located on the obverse surface of the skin on which ice accumulates. In U.S. Pat. No. 3,809,341 flat buses are arranged opposite one another with one side of each bus being adjacent an inner or obverse surface of an ice collecting wall. An electric current is passed through each bus and the resulting interacting magnetic fields force the buses apart and deform the ice collecting walls. The disadvantage of the aforedescribed electromechanical systems is that each operates on the structural skin of the airfoil and a predetermined skin deflection is required to provide a set level of ice removal. A large force is required in order to generate the needed amount of skin deflection. Such high skin deflections are believed likely to cause fatigue in the skin.

U.S. Pat. No. 4,690,353 to Haslim et al. describes another subcategory of electromechanical deicing. One or more overlapped flexible ribbon conductors embedded in an elastomeric material are affixed to the outer surface of an airfoil structure. The conductors are fed large current pulses from a power storage unit. The resulting interacting magnetic fields produce an electro-expulsive force which distends the elastomeric member and separates the elastomeric member from a solid body such as ice thereon. The distention is almost instantaneous when a current pulse reaches a conductor. In preferred embodiments having multiple electrical conductors, the electrical conductors each have a serpentine configuration.

The present invention is an improvement over that disclosed in U.S. Pat. No. 4,690,353. Applicants have found that the arrangement of the conductors, and particularly the direction of current flow in adjacent ones of the electrically conductive members can produce much greater electroexpulsive force than the serpentine configuration taught by Haslim et al. Applicants have found that delivery of a current pulse of predetermined magnitude, shape and duration provides more effective de-icing.

SUMMARY OF THE INVENTION

According to an aspect of the present invention there is provided de-icing apparatus comprising a first sheet-like array of a plurality of first electrically conductive members electrically insulated from one another in parallel spaced-apart relationship, and a second sheet-like array of a plurality of second electrically conductive members electrically insulated from one another in parallel spaced-apart relationship, said electrically conductive members being electrically interconnected so that any electrical current flowing in the electrically conductive members flows in the same direction in adjacent first electrically conductive members and also flows in adjacent second electrically conductive members in a direction opposite to the flow in said first electrically conductive members, thereby producing an electroexpulsive separation force between said first and second electrically conductive members which produces a separation between said first and second electrically conductive members, said first sheet-like array being coextensive with and superposed proximate to said second sheet-like array so that said first and second electrically conductive members are substantially parallel.

According to another aspect of the present invention, there is provided a deicing apparatus like that just described in the immediately preceding paragraph further including a third sheet-like array of a plurality of third, electrically conductive members electrically insulated from one another in parallel spaced-apart relationship, said third sheet-like array superposed proximate to said first sheet-like array, and a fourth sheet-like array of a plurality of fourth, electrically conductive members electrically insulated from one another in parallel spaced-apart relationship, said fourth sheet-like array superposed proximate to said second sheet-like array so that said third and said fourth electrically conductive members are substantially parallel to said first and said second electrically conductive members, said electrically conductive members of said third and fourth sheet-like arrays being electrically interconnected so that any electrical current flowing in said third electrically conducive members flows in the same direction as in said first electrically conductive members and also flows in said fourth electrically conductive members in the same direction as in said second electrically conductive members.

According to a further aspect of the present invention, there is provided de-icing apparatus comprising at least two upper and two lower superposed coextensive layers of electrically conductive members, each of said layers being proximate to an adjacent layer and electrically isolated from any adjacent layer, each of said layers having a plurality of parallel, closely spaced, electrically conductive members, the layers being arranged so that the electrically conductive members in all layers are substantially parallel and overlie one another, the electrically conductive members being interconnected so that any electrical current flowing in the corresponding proximate electrically conductive members of said upper layers flows in the same direction and also flows in corresponding proximate electrically conductive members of said lower layers in a direction opposite to the flow in the electrically conductive members of said upper layers, thereby producing an electroexpulsive separation force between said upper and said lower layers of electrically conductive members which produces a separation between said first and second electrically conductive members, the layers being joined to define a unit.

According to a further aspect of the present invention there is provided electrical circuit means coupled to said conductive members, the circuit means generating large current pulses of predetermined magnitude, shape and duration.

In preferred embodiments, four superposed layers of electrically conductive members are present and the direction of current flow in the electrically conductive members of each of the two layers on the same side of the central separation surface is in the same direction. The direction of current flow of the immediately opposed electrically conductive members which immediately face each other on opposite sides of the central separation surface is opposite. Most preferably, the direction of electrical current flow of all of the electrically conductive members in any layer is the same and the direction of electrical current flow in the adjacent layers on the same side of the central separation surface is the same.

The above and other features and advantages of the present invention will become more apparent when viewed in light of the description of the best embodiment of the invention and the drawings which follow, which together form a part of the specification.

DESCRIPTION OF THE DRAWINGS

FIG. 1b is a fragmentary sectional perspective view of the serpentine overlapped ribbon conductor of FIG. 1a.

FIG. 2b is a fragmentary sectional perspective view of the flat coil conductor of FIG. 2a.

FIG. 7 is a fragmentary sectional view of an airfoil in combination with an electroexpulsive deicing apparatus according to an embodiment of the present invention.

FIG. 8a is a fragmentary perspective view of an airfoil in combination with a plurality of deicing devices according to the present invention.

FIG. 8c is an enlarged fragmentary sectional view of one of the deicing elements of the deicing apparatus of FIG. 8a.

FIG. 9a is a fragmentary perspective view depicting a plurality of deicing devices in combination with an airfoil.

FIG. 9b is an enlarged fragmentary perspective view taken along plane 9b—9b of FIG. 9a.

FIG. 9c is a schematic diagram of part of an electrical control circuit for use with the embodiment of FIG. 9a.

FIG. 9d is an alternate schematic diagram of part of an electrical control circuit for use with the embodiment of FIG. 9a.

DETAILED DESCRIPTION OF THE INVENTION

The present invention provides a method and apparatus for deicing a leading edge. Deicing is the removal of ice subsequent to its formation upon a leading edge. A leading edge is that portion of a surface of a structure which functions to meet and break an air stream impinging upon the surface of the structure. Examples of leading edges are the respective forward portions of wings, stabilizers, struts, nacelles, and other housings and protrusions first impacted by an airstream over an aircraft while in flight.

Figure 1A:
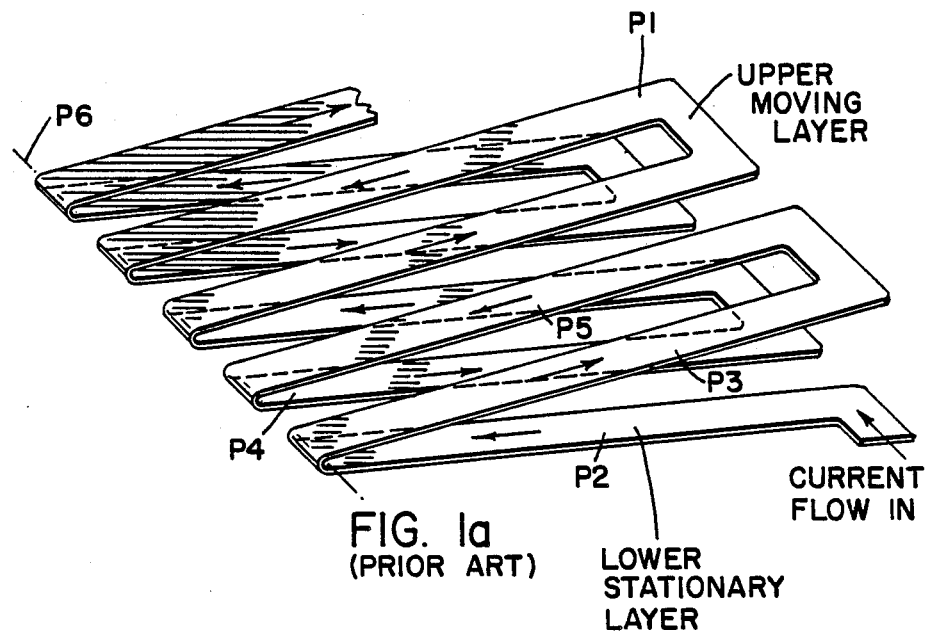
FIG. 1a is a perspective view of an overlapped serpentine ribbon conductor according to the prior art.

FIG. 1a shows a zigzag or serpentine shaped ribbon conductor p1 as taught by Haslim et al, U.S. Pat. No. 4,690,353. The zigzag conductor p1 has been folded along axis p6 to form upper and lower sets of conductor segments. To facilitate illustration elastomeric material normally encapsulating the conductor p1 is not shown. The arrows on the conductor segments depict one possible current flow path through the ribbon conductor p1. It is to be noted that the current flow in each lower conductor segment is antiparallel to the current flow in the corresponding overlapping upper conductor segment. Specifically the current direction in conductor segment p2 is antiparallel to the current direction in overlapping conductor segment p3. The current direction in segment p4 is antiparallel to the current direction in segment p5, etc. Thus, when an electrical energy storage unit is discharged through the conductor p1, and massive current flows through that conductor, conductor segments p2 and p4 are instantaneously and forcefully repelled from conductor segments p3 and p5, respectively.

Figure 2A:
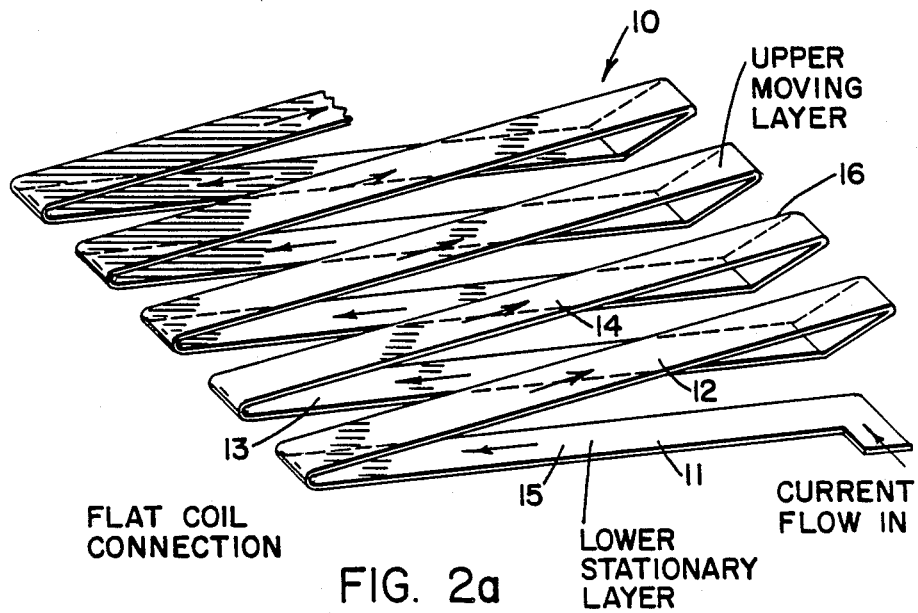
FIG. 2a is a perspective view of a flat coil conductor configuration for a deicing construction according to the present invention.

FIG. 2a depicts a flat coil construction conductor 10 according to the present invention. The arrows depict one possible current flow pattern through the flat coil ribbon conductor 10. It is to be noted that the current flow in laterally adjacent first electrically conductive members 11 and 13 flows in the same direction and also flows in laterally adjacent second electrically conductive members 12 and 14 in a direction opposite to the flow in said first electrically conductive members. In other words, all of the electrically conductive members in the lower layer 15 have current flow in the same direction while the current flow in all of the electrically conductive members of the upper layer 16 is in the opposite direction.

Figure 1C:
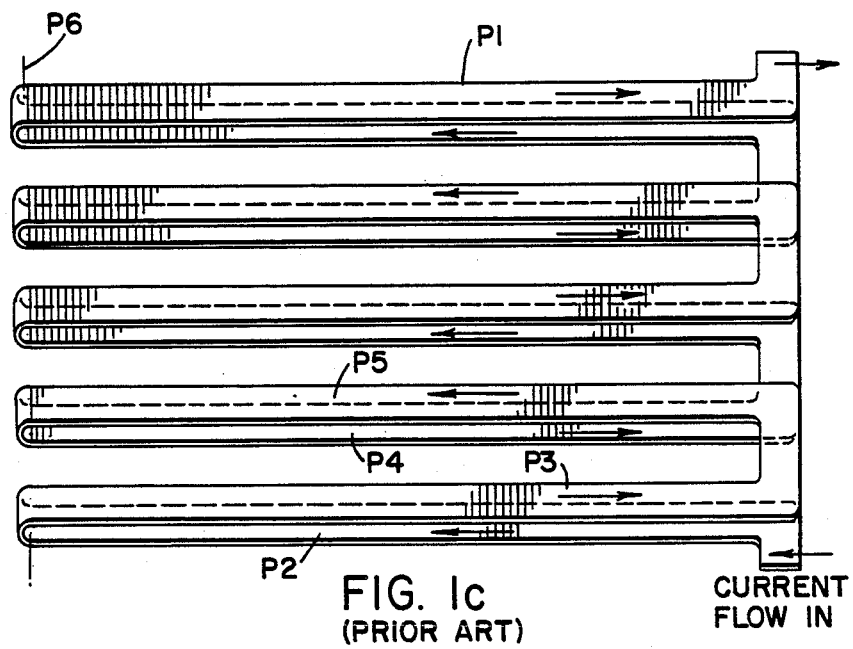
FIG. 1c is an oblique view of an overlapped serpentine ribbon conductor according to the prior art.
Figure 2C:
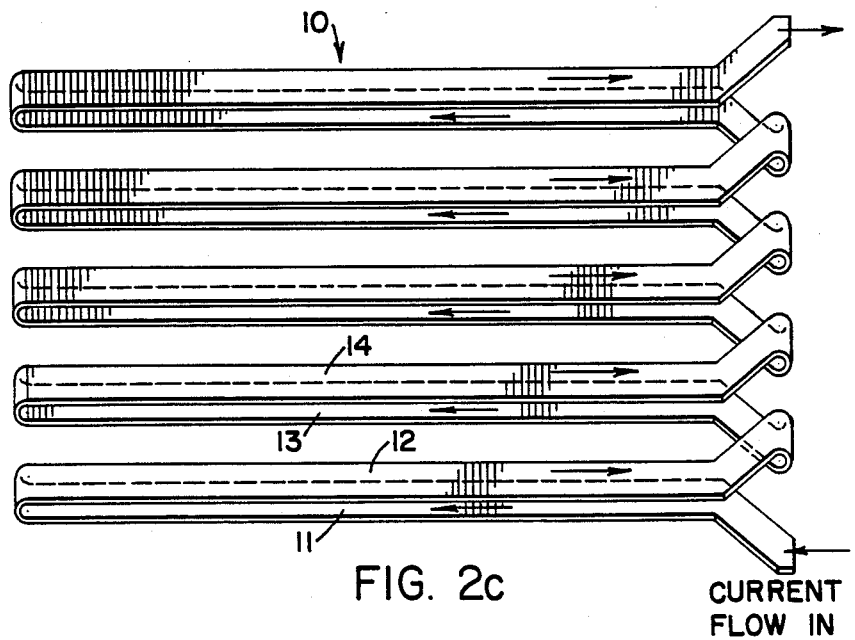
FIG. 2c is an oblique view of a single layer flat coil conductor construction according to the present invention.
Figure 1B:
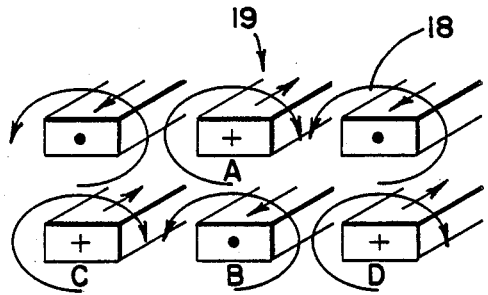
Figure 2B:
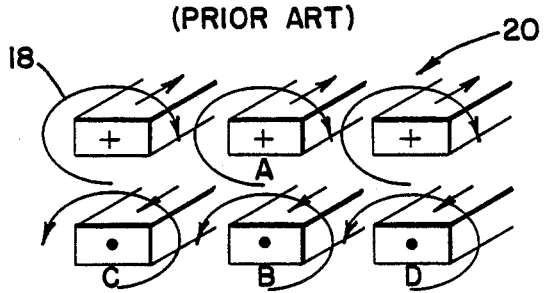

FIGS. 1a, 1b, and 1c when compared to FIGS. 2a, 2b and 2c illustrate the difference in current flow in the conductors of a device according to the prior art (FIG. 1) and in a device according to the present invention (FIG. 2) when there are only two layers of conductors. Throughout Figures of this specification, a dot is used to represent current flowing out of the page and a plus sign is used to represent current flowing into the page. The arrows 18 encircling the conductors represent the direction of the magnetic field resulting from the flow of current in its associated conductor. The oblique plan views of the conductor arrangement according to the prior art as shown in FIG. 1c and according to the present invention as shown in FIG. 2c further illustrate the method in which the electrically conductive members are electrically interconnected to achieve the current flow as depicted in FIGS. 1b and 2b, respectively.

Figure 10:
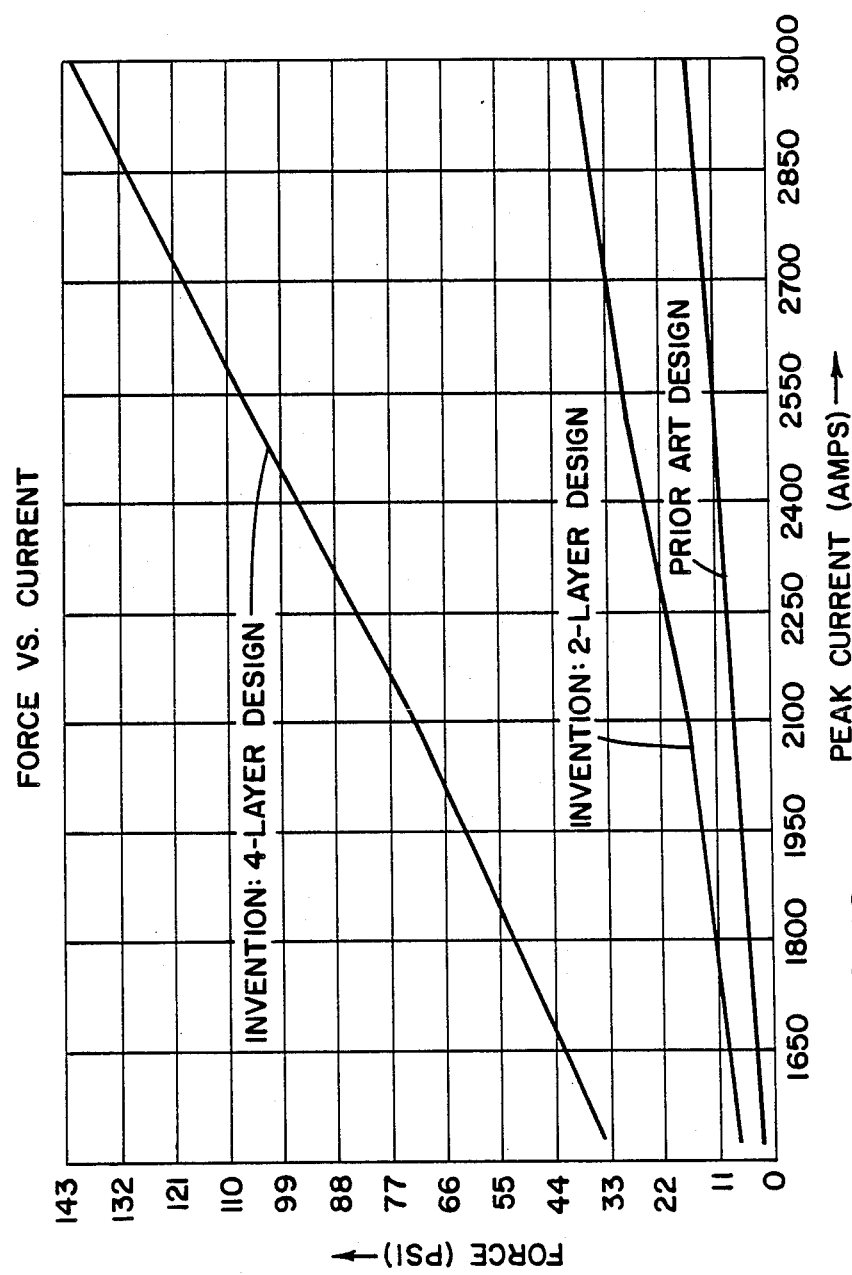
FIG. 10 graphically depicts the comparative performance of two embodiments of deicing apparatus according to the present invention and one according to the prior art.

The influence of this seemingly minor difference in electrical connections and current flow is very significant. Referring now to FIG. 10, there is shown the results of testing a prior art 2-layer electroexpulsive separation system according to Haslim et. al., U.S. Pat. No. 4,690,353, having a conductor arrangement and current flow pattern as shown in FIGS. 1a, 1b, and 1c as compared with the performance of 2-layer apparatus according to the present invention having a current flow pattern as depicted in FIGS. 2a, 2b and 2c. For devices of otherwise equivalent construction, i.e. the same conductor material at the same horizontal spacing and a vertical separation of 0.039 inches between opposed conductors and the same dielectric materials and dimensions, the maximum separation force generated for a given current pulse shape, magnitude and duration for devices according to the present invention in which the at rest state separation of the electrically conductive members immediately facing each other on opposite sides of the central separation surface is the same, is more than twice that for devices of otherwise identical construction but having the serpentine configuration as taught by Haslim et.al.

Figure 3:
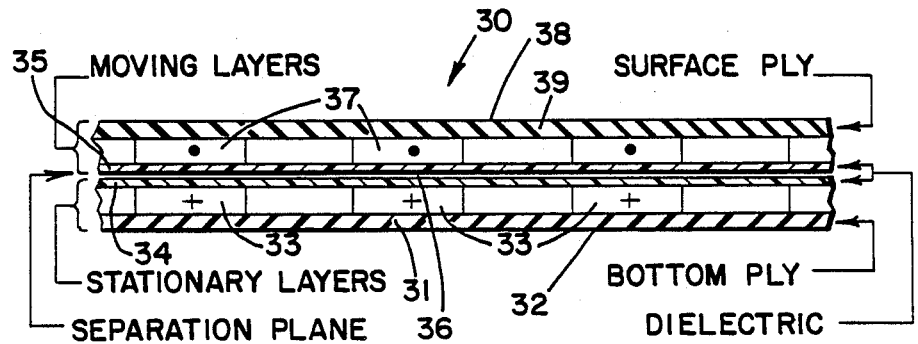
FIG. 3 is a fragmentary sectional view of a deicing apparatus in accordance with the present invention.

Referring now to FIG. 3, there is shown a deicing apparatus 30 according to a preferred embodiment of the present invention having electrically conductive members arranged as depicted in FIGS. 2a, 2b and 2c. The deicing apparatus 30 includes a bottom ply 31 of dielectic material such as rubber or other elastomer which provides a surface 32 for attachment to the outer surface of an airfoil (not shown), such as, for example, by adhesive bonding. A plurality of electrically conductive members 33 are arranged substantially parallel to one another in a sheet-like configuration overlying the bottom ply 31. Overlying the first layer of ribbon-like conductive members 33 is a sheet-like insulating member 34 of dielectric material. Preferably the dielectric material is a flexible high-modulus plastic such as polyimide available from E.I. duPont de Nemours & Company, under the trademark KAPTON ®. Two layers 34 and 35 of dielectric film are placed adjacent one another on opposite sides of the central separation surface or plane 36 to facilitate separation of the lower layer of conductors 33 and its associated plies from the upper layer of conductors 37 and its associated plies. The upper outer surface 38 of the deicing apparatus 30 includes a surface ply 39 chosen for its resistance to cutting and erosion from being impacted by rain, snow, sleet, hail, etc. Elastomeric materials such as rubber and polyurethanes or plastics such as PEEK (polyetheretherketone) or a thin metal layer such as titanium or stainless steel foil may be utilized for the outer surface 38 of the deicer apparatus 30. Preferably the ice accreting surface ply has a modulus of elasticity of at least 275,000 kPa. The upper outer surface 38 of deicier apparatus is suitably formed from a metal selected from the group consisting of titanium and its alloys, aluminum and its alloys, magnesium and its alloys, and stainless steels. Where the surface ply 39 is not formed of dielectric material, a layer of dielectric material is positioned between the upper layer of conductors 37 and surface ply 39. Where the surface ply is of insufficient strength and modulus to maintain structural integrity of the deicing apparatus upon energization, a fabric reinforcing layer is included between the surface ply and the sheet-like arrays of electrically conductive members.

Figure 4A:
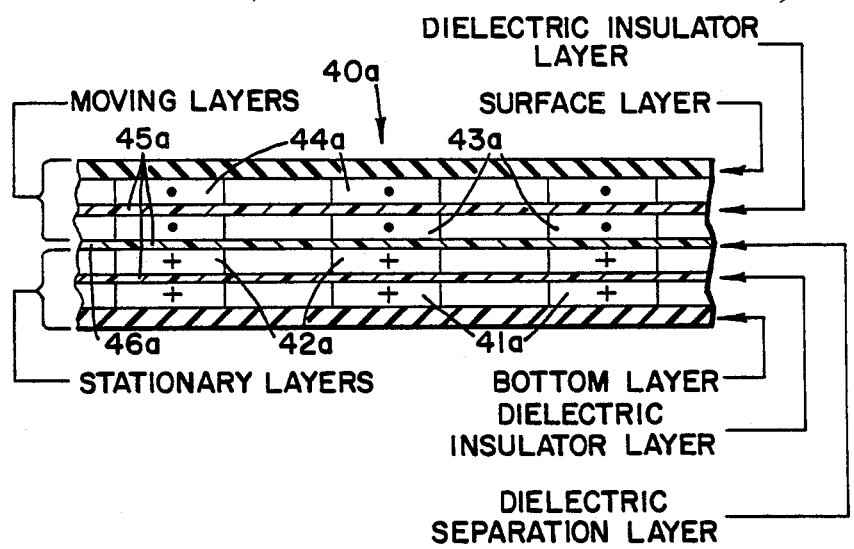
FIGS. 4a and 4b depict alternate embodiments of deicing apparatus according to the present invention.
Figure 4B:
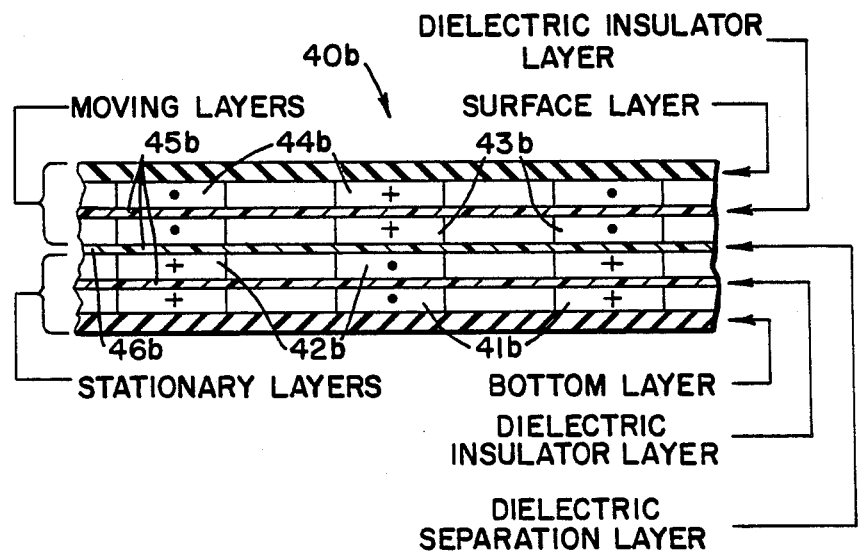

FIGS. 4a and 4b depict respective preferred embodiments 40a and 40b deicer apparatuses according to the present invention. In FIGS. 4a and 4b, like parts are numbered alike except for that letter "a" is employed as a suffix for parts in FIG. 4a whereas letter "b" is employed as a suffix for parts in FIG. 4b. These constructions are alike except that the interconnections at the ends of the parallel electrically conductive members 41a, 42a, 43a and 44a of FIGS. 4a and 41b, 42b, 43b, and 44b of FIG. 4b are differently arranged so that the direction of electrical flow is different. Each of the layers of electrically conductive members is separated from next adjacent layer of electrically conducive members by a layer of dielectic film 45a, 45b. In each of these constructions, however, the electrical current flow in conductors which are stacked upon one another on opposite sides of the central separation plane or surface 46a, 46b is the same, resulting in increased separation force for a given current flow when all other parameters are equal. The arrangement depicted in FIG. 4a generates a greater electroexpulsive force at a given electrical current input than that depicted in FIG. 4b because the force generated by any given vertical pair, for example, the central pair, of conductors in the upper two layers 43a, 44a is not reduced due to their interaction with conductors positioned on each side of the central pair of the two layers 41a, 42a of conductors directly below. In the embodiment shown in FIG. 4b the magnetic field established by current flowing in the central pair of conductors 43b, 44b carrying +current is partially canceled by the magnetic field established by current flowing in left and right edge pairs of conductors 41b, 42b.

A construction like that of FIG. 4a but having its electrically conductive members interconnected so that any electrical current flowing in adjacent electrically conductive members within a given layer is in the same direction but opposite to that of any layer positioned above or below thereof has also been evaluated and found not to perform as well as the embodiment shown in FIG. 4a. This lesser-desired embodiment if illustrated would be depicted, for example, with all plus symbols in the uppermost layer, all dot symbols for the second layer from the top, all plus symbols for the third layer from the top, and all dot symbols for the lowest layer of conductive members.

Figure 5A:
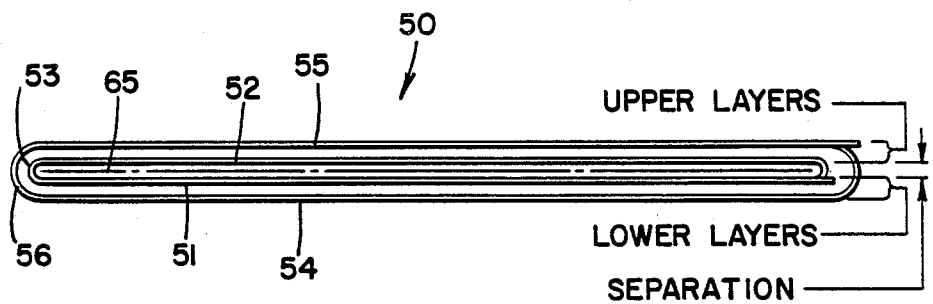
FIGS. 5a and 5b, respectively, depict a side elevational view and an oblique top view of electrical conductor assemblies according to the present invention.
Figure 5B:
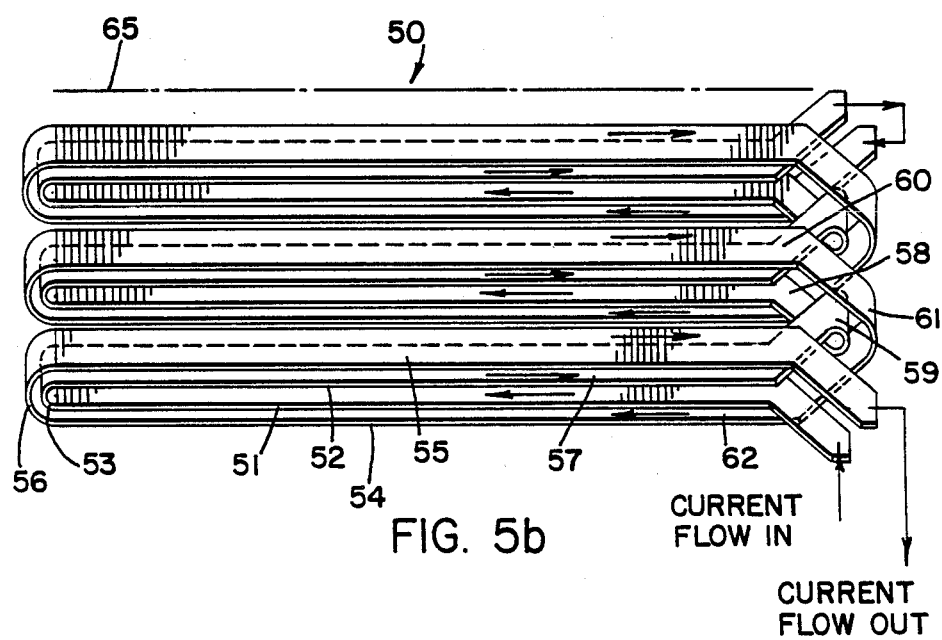

FIGS. 5a and 5b illustrate a highly preferred embodiment of a four conductor layer deicer construction 50 having flat coil connections. For simplicity of illustration and explanation only the arrangement of the conductive members is shown. The arrows on the conductive members represent the direction of flow of the electrical current within the conductive members. As shown in FIG. 5a, the innermost two layers 51, 52 of flat coil conductors, which are immediately adjacent to and on opposite sides of the central separation plane 65, are joined at one end 53 to define a U-shaped configuration in side elevational view. In like manner the aftermost two layers 54, 55 of electrically conductive members, which are most distal from the central separation plane 65, are joined at one end 56 to define a U-shaped configuration in side elevational view. Referring now to the right hand edge of FIG. 5b, the arrangement of the electrical interconnections is shown. An upper conductor 57 of upper inner layer 52 is connected at joint 59, e.g. by soldering, welding, brazing or bending as shown, to the laterally adjacent lower conductor 58 of the lower inner layer 51. This pattern is repeated throughout the inner layers 51 and 52. In like manner, upper conductor 60 of upper outer layer 55 is connected at joint 61 to the corresponding laterally adjacent lower conductor 62 of outer layer 54. Rather than the U-shaped folded configuration shown at the left-hand edge of FIGS. 5a and 5b, the conductors may be separately laid up in each layer and joined by soldering, brazing, welding or the like.

The basis for the improvement in the expulsive force produced by the interacting magnetic fields in the two conductive layer construction of the present invention 20 as illustrated in FIG. 2b may be better understood when compared with the prior art construction shown in FIG. 1b. In each construction, opposite direction current flows in conductors labeled A relative to conductors labeled B which causes a repulsive force tending to separate conductors A and B. The arrow-18 encircling each conductor represents the magnetic field existent when current is flowing through that conductor in the direction indicated. A similar reaction occurs between conductors A and B of the construction of FIG. 2b. However, additionally, current flowing through conductors C and D of construction 20 shown in FIG. 2b according to the present invention produces additional repulsive force in conductor A. In contrast, in the prior art construction 19 depicted in FIG. 1b, current flowing in conductors C and D is in the same direction as current flow in conductor A, thus producing an attracting force which partially offsets the repulsive reaction between conductor A and conductor B. The net effect of these interactions is of major significance as depicted graphically in FIG. 10. A much higher amperage is required to achieve the same net expulsive force in a construction 19 according to the prior art than in construction 20 according to the present invention.

Figure 6A:
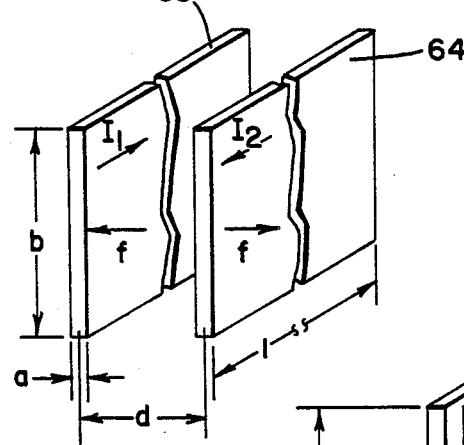
FIGS. 6a and 6b, respectively, are perspective views illustrating the theory for the separation force between long, thin, flat electrical conductors.
Figure 6B:
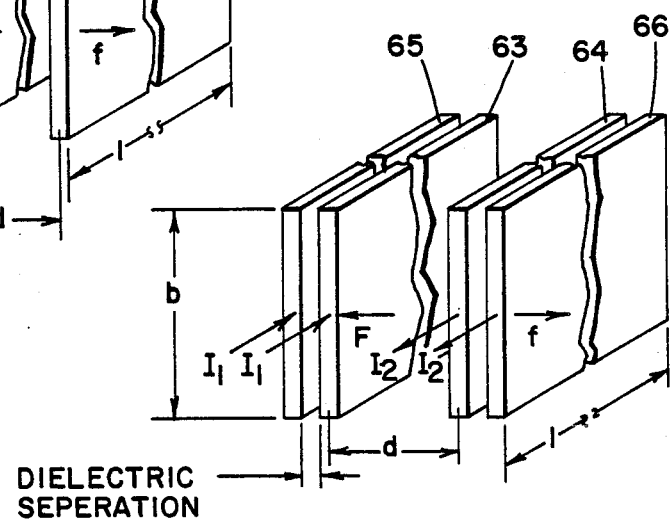

Referring now to FIGS. 6a and 6b the basis for improvement of a four-conductor layer construction according to the present invention over a two-layer construction may be explained as follows. An equation that describes the force between two the current carrying conductors 63, 64 illustrated in FIG. 6a is $$\frac{f}{1} = 4 \times 10^{-7} \frac{I_1 I_2}{b^2} \left( b \tan^{-1} \frac{b}{d} - \frac{d}{2} \ln \frac{d^2 + b^2}{d^2} \right) \frac{\text{newtons}}{\text{meter}}$$

for $d >> a$ where
- $f/1$ = force per unit length of conductor (newtons/meter)
- $b$ = conductor width (meters)
- $d$ = conductor separation (meters)
- $a$ = conductor thickness (meters)
- $I_1$, $I_2$ = current in conductors (amperes)

The force between the conductors 63, 64 attracts each toward the other if the direction of current flow is the same or repels them apart from one another if the current flowing in one is opposite to the direction of current flow in the other. Expressed in English units, the above equation becomes $$\frac{f}{1} = 2.741 \times 10^{-8} \frac{I_1 I_2}{b^2} \left( b \tan^{-1} \frac{b}{d} - \frac{d}{2} \ln \frac{d^2 + b^2}{d^2} \right) \frac{\text{lbs.}}{\text{ft.}}$$

for $d >> a$ where
- $f/1$ = force per unit length of conductor (lbs./ft.)
- $b$ = conductor width (ft.)
- $d$ = conductor separation (ft.)
- $a$ = conductor thickness (ft.)
- $I_1$, $I_2$ = current in conductors (amperes)

When the currents $I_1$ and $I_2$ are of the same magnitude, although they do not have to be, the force between the conductors 63, 64 is proportional to the square of the current ($I^2$). Thus, if the current were doubled, the force would be increased by a factor of four. The construction shown in FIG. 6b realizes this possibility by inclusion of two additional outer conductor layers 65, 66 adjacent to but electrically isolated from the two inner layers 63, 64 of conductors which additional conductor layers carry current of the same magnitude. It is, of course, possible to utilize a current of a different magnitude in any of the conductive layers shown in FIG. 6b. When the current magnitude in all of the conductor layers is the same, the effective force is increased approximately four times without increasing the magnitude of current pulse into the deicer unit. Additionally, when the improved structure of the present invention as illustrated in FIGS. 4a and 5 is utilized with all other factors being equal, a net effective force improvement is realized. This increase in performance is graphically illustrated in FIG. 10 by the uppermost performance line.

It is not required that four or more layers or that an even number of layers be employed in order to take advantage of this principle. For example, FIG. 7 shows a deicing apparatus 70 in combination with the leading edge 71 of an airfoil 72 or the like. The deicing apparatus includes three layers 73, 74 and 75 of electrically conductive members, each layer separated from the adjacent layer by a dielectric film 76 and free to move apart from any adjacent layer of conductors. The current required for this three-layer construction 70 as compared with the two-layer construction 10 depicted in FIG. 2 is much less to achieve the same level of separation force to effect deicing of the outer ice accreting surface 78 of the leading edge. Conduit 77 is connected to a vacuum source (not shown) to prevent self expansion of deicing apparatus 70 due to the lifting forces generated by air flowing over the airfoil 72.

Figure 8B:
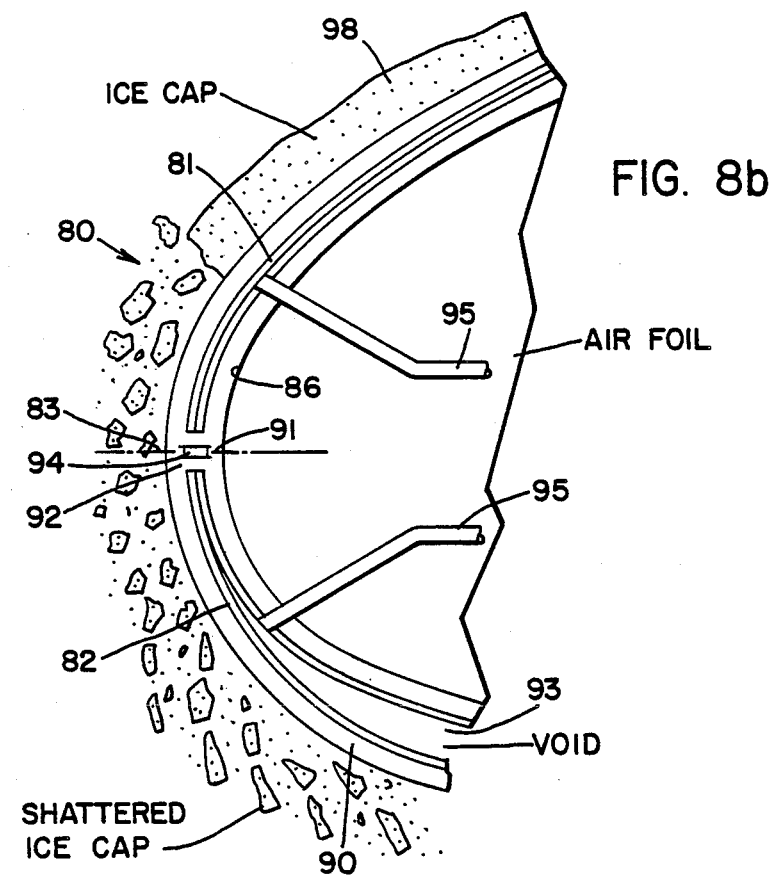
FIG. 8b is a fragmentary sectional view taken along plane 8b—8b of FIG. 8a depicting operation of an embodiment of a deicing apparatus according to the present invention, in combination an ice covered leading edge of an airfoil.
Figure 8C:
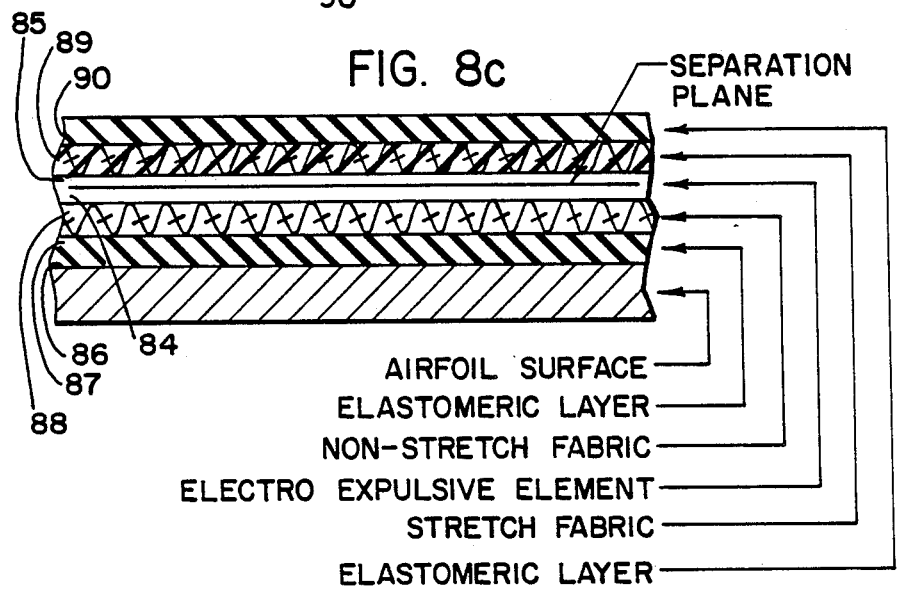

FIGS. 8a, 8b and 8c illustrate a further preferred embodiment of electroexpulsive deicer according to the present invention. FIG. 8a depicts a plurality of deicer pads 80 each of which includes first and second electroexpulsive units 81 and 82 disposed rearwardly of the leading edge centerline 83. Each of the electroexpulsive units 81 and 82 includes at least two layers 84 and 85 of electrical conductive members as illustrated in FIGS. 8b and 8c. As previously described, and as shown in FIG. 8c, these electrically conductive members 84, 85 are embedded in or affixed to layers of dielectric material such as a plastic film to form a sheet-like array. As best illustrated in the enlarged fragmentary sectional view of FIG. 8c, adjacent the airfoil surface 86 is a layer 87 of elastomer which is provided to facilitate bonding to the airfoil surface 86. Overlying elastomeric layer 87 is a layer 88 of stretch resistant fabric coated with or embedded in elastomeric or polymeric material. Overlying the outermost layer 85 of electrically conductive members is layer of extensible fabric 89 coated with or embedded in elastomeric or polymeric material. Overlying the outer fabric layer 89 is a layer 90 of erosion resistant elastomer, preferably polyurethane.

As shown in FIG. 8a, the longitudinal centerline 91 of the deicer pads 80 corresponds to the centerline 83 of the leading edge. The centerline 91 extends spanwise of the airfoil fragment 92 depicted in FIG. 8a. The term "spanwise" as used herein means in a direction parallel to the leading edge of the airfoil. The term "chordwise" as used herein means in a direction along a line extending from the leading edge of an airfoil to the trailing edge of that airfoil. As shown in FIG. 8b, a center fillet 92 of polymeric material is positioned on the centerline 83 of the leading edge surface 86 between the first and second electroexpulsive units 81, 82. Overlying the center fillet 92 and the electroexpulsive units 81 and 82 is an outer layer 90 of erosion-resistant material. The outer layer 90 of erosion-resistant material, the electroexpulsive apparatuses 81, 82, base layers 87 and 88, and center fillet 92 and are preassembled into a modular unit 80 or deicing pad which is fitted to the exterior surface 86 of the airfoil, preferably by adhesive bonding. Multiple modular pads 80 may be joined to one another prior to their being attached as a unit to a leading edge.

FIG. 8b additionally illustrates the effect of application of a large current pulse to the lower deicing element 82 which results in separation of the electrically conductive layers thereof from each other creating a void or cavity 93 between them, distorting the outer layer 90 causing the ice 98 that had accumulated thereon to be shattered and thrown off into the airstream passing over the airfoil. The layer of extensible fabric 89 and elastic outer surface layer 90 together act to return the separated layers 84, 85 of electrically conductive members to their rest position as shown in regard to the upper element 81 illustrated in FIG. 8b. Vacuum conduits 95 are provided to prevent self-distension of electroexpulsive units 81 and 82 due to lifting force generated by air passing over the airfoil.

Following energization of the lower electroexpulsive deicing element 82 of FIG. 8b, the upper electroexpulsive element 81 is energized to deice the upper surface of the airfoil. When an electroexpulsive element on the upper (or lower) surface is energized, the corresponding electroexpulsive element on the lower (or upper) surface is left dormant. This sequence is then reversed to energize the element that was dormant and to leave dormant the element previously energized. By sequentially operating the elements in this manner, surface strains are induced along the leading edge sufficient to debond ice from the outer surface of the deicer. These forces, in conjunction with rapid surface acceleration and displacement and momentum imparted to the ice are effective to remove thin or thick layered and other forms of ice.

As shown in FIG. 8b, the center line 83 of the leading edge of deicer pad 80 may be constructed with textile reinforcements 94 extending in the direction of thickness of the deicer pad 80 as illustrated or by the use of gum rubber. Where the airfoil has a sharp leading edge (not illustrated), the upper and lower surface electroexpulsive elements may be pre-assembled prior to application to an airfoil into a unit including a filler along the leading edge between the electroexpulsive elements This filler is utilized to maintain a smooth surface along the leading edge radius. In a sharp leading edge airfoil (not illustrated), the pivot point of the outer surface materials will be on the leading edge centerline. This pivot point will functionally imitate the previously described effects of a stitch line on the leading edge centerline. When the electroexpulsive element does not wrap completely around the leading edge, the outer surface covering materials are free to stretch and therefore develop high surface strains facilitating separation of ice from the outer surface. Tests indicate that an individual electroexpulsive element wrapped around the leading edge and trailing several inches rearward on both sides of the leading edge is not as effective in ice removal.

Having reference to FIG. 8a and FIG. 9a, a plurality of electroexpulsive deicing elements A, B, C, D, E, F as shown in FIG. 8a and A, B, C, D, E, F, G, H, I as shown in FIG. 9a may be provided to enable deicing of an airfoil such as the fragment respectively shown in each figure. A preferred energization pattern for ice removal in FIG. 8a incorporates sequential application of a large electrical current pulse to electroexpulsive elements A, B, C, D, E, F, etc. A different pattern may be preferable for a particular airfoil structure, such as A, D, E ... or B, C, F ..., or A and D, B and C etc. where longitudinal and torsional forces of predetermined magnitude and pattern are thereby intentionally induced into the airfoil structure and contribute to effective ice removal.

As shown in FIGS. 9a and 9b, a third set of small electroexpulsive elements C, F, and I may be positioned overlapping the centerline of the leading edge to enhance ice removal on an airfoil 96 having a leading edge 97 of small radius. Elements C, F and I are small relative to elements A, D, G and B, E, H. Elements C, F and I extend chordwise only a small portion of the total ice accreting distance from the leading edge centerline. Element C can be operated concurrently or separately relative to complementary elements A and B. A preferred energization pattern for the embodiment of FIG. 9a is A and C, B and C, D and E, E and F, etc. Different patterns similar to those previously described as well as A, B, C, D, E, F, or C, A, B, E, D, F, ... and others may be employed to enhance ice removal by inducement of longitudinal and torsional forces of predetermined magnitude and pattern in the underlying airfoil structure. The construction of the individual electroexpulsive elements may be the same as that shown and described in reference to FIG. 8, and multiple elements may be assembled to form a unitary deicer pad in a manner similar to the embodiment of FIG. 8.

The use of multiple electroexpulsive elements and sequential firing is highly preferred for most applications because otherwise insufficient energy may be available to fire all elements at once. When sequential energization is practiced, a smaller and lighter weight power supply may be used, and different strain patterns may be induced to enhance ice removal.

To minimize electromagnetic radiation, a shielded cable such as cable 170 shown in FIG. 8a may be used to connect the power supply to a plurality of electroexpulsive elements. As shown in FIG. 8a, upper electroexpulsive elements A, C, and E are respectively joined to corresponding separate insulated electrical feed conductors 171, 172 and 173 which extend centrally throughout the length of cable 170. Surrounding conductors 171, 172 and 173 is a braided electrically conductive shield 178 to which all of the corresponding return leads 181, 182, 183 of the respective electroexpulsive elements A, C and E are joined, for example, by swaging, by soldering, brazing, welding or the like to ring 179. Ring 179 may be secured to shield 178 in like manner. Cable 170 includes an outer insulating jacket 180. Because the current flowing in the shield is equal in magnitude and opposite in direction to that of the center conductors and generates an equal but opposite external magnetic field, no magnetic field exists external to the shield. Shield 178 is not grounded at the electroexpulsive elements so that all return current flows through the shield. While only three central feed conductors are illustrated, a greater number of conductors could be provided to serve a greater number of electroexpulsive elements with a single cable.

Figure 11:
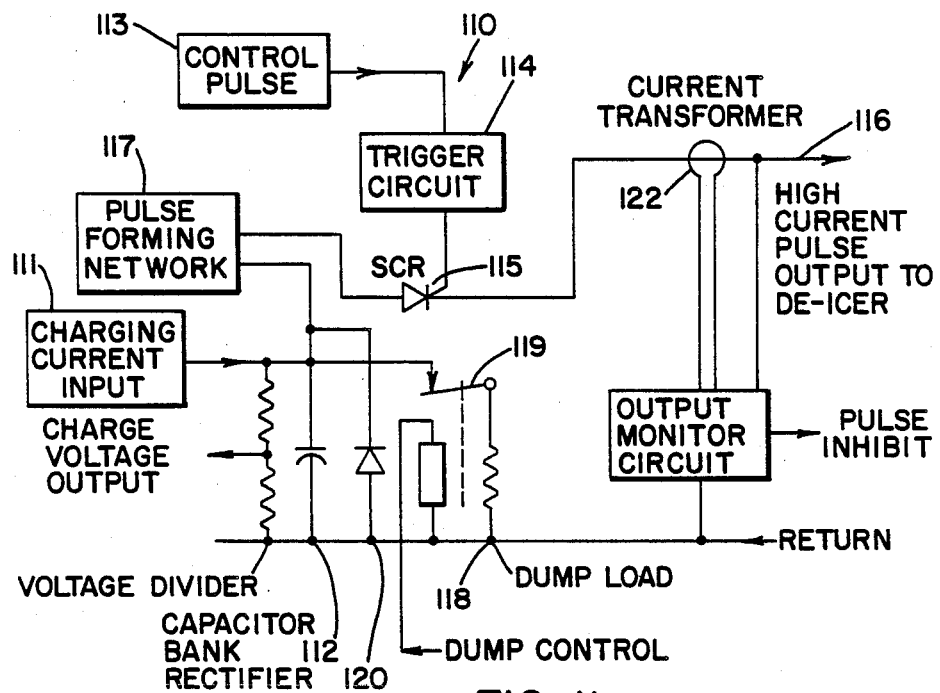
FIG. 11 is a schematic diagram of part of an electrical circuit for an electroexpulsive separation system according to the present invention.

A control circuit 110 for use with deicers of the present invention is illustrated in FIG. 11. The charging circuit 111 charges up a bank of capacitors 112 (only one is illustrated for simplicity) which serve as high voltage energy storage devices. When deicing action is desired, a control pulse 113 is fed to the triggering circuit 14 which enables discharge of the capacitor bank 112 through one or more silicon control rectifiers (SCRs) 115 to provide a high current pulse outputs 116 to one or more electroexpulsive apparatus. According to the prior art, the capacitor bank output was directly fed into the deicing element. In contrast, applicants have confirmed through laboratory testing that more effective deicing action occurs when a pulse forming network (pFN) 117 is added to the control circuit 110 to shape the high current pulse 116 applied to the electroexpulsive deicer element. Thus, according to the present invention, it is preferable to utilize in combination with the deicer element an electrical circuit means coupled to the conductive members in which the circuit means generates large current pulses of predetermined magnitude, shape, and duration. Use of a PFN also minimizes electromagnetic interference upon energization of the electroexpulsive deicer system by controlling the high frequency content of the high current pulse.

Referring to the circuit 110 depicted in FIG. 11, whenever an output current pulse 116 is desired, the dump load 118 which maintains the capacitor bank discharged, is removed by opening switch 119 thereby allowing charging current from charging circuit 111 to charge the capacitor energy storage bank 112 to the desired voltage. When the SCR 115 is triggered on, the capacitor bank 112 is discharged through the PFN 117 into an electroexpulsive deicer (not illustrated in FIG. 11), producing the high current pulse, whose occurrence and magnitude is monitored by means of current transformer 122.

Figure 12:
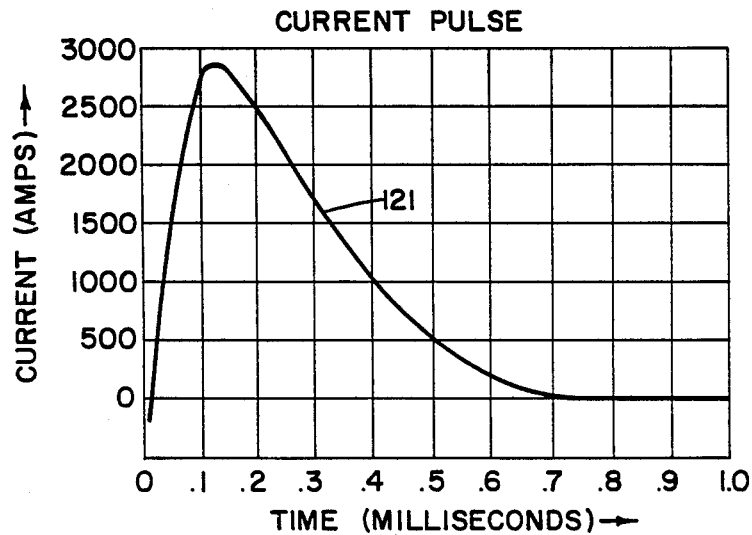
FIG. 12 graphically depicts the current pulse output of a preferred electrical circuit according to a preferred embodiment of the present invention.

An embodiment of a PFN like that just described including an air-core inductor was employed to produce the current waveform 121 depicted in FIG. 12 which is characteristic of a damped RLC circuit.

The PFN shapes the waveform such that at least about 0.05 millisecond and preferably about 0.1 millisecond is required for the high output current pulse to rise to peak current. The pulse may be a clean overdamped exponentially decaying sinusoidal waveform as depicted in FIG. 12 and achieved by an RLC electrical circuit. In the event that the component values of the RLC circuit are selected in a known manner such that the circuit may be or become underdamped or oscillatory in nature, the circuit should be configured such that rectifier 120 dumps the stored energy of the circuit inductance into the deicer load, producing a single non-oscillatory pulse with an extended trailing edge.

The inductor coil used for this RLC embodiment of pulse forming network 117 may be a spirally wound coil, a helically wound coil, toroidal coil or a single-multilayer cylindrical-shaped coil. Saturable magnetic core coils have also been evaluated where the coil is intentionally saturated. Initially the unsaturated coil has a high inductance which controls the initial slope of the current pulse. Thereafter, the coil saturates having the desired lower inductance value for obtaining the high peak current.

Figure 13:
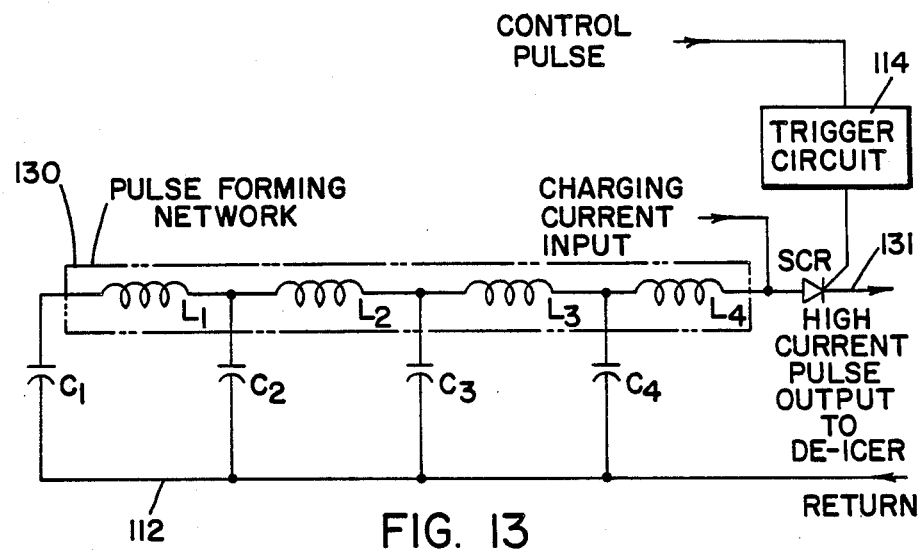
FIG. 13 is a schematic diagram of an alternate embodiment of a pulse forming network for use in a separation system according to the present invention.
Figure 14:
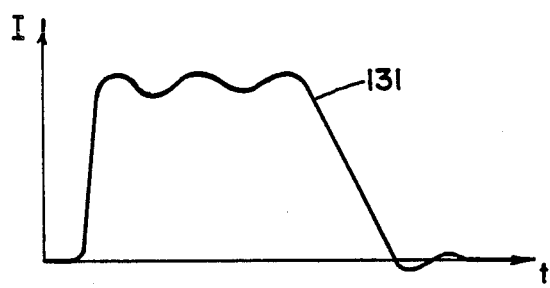
FIG. 14 graphically illustrates the output current wave form shaped by the pulse forming network of FIG. 13.

FIG. 13 illustrates an embodiment of a pulse forming network 130 whose current output waveform approximates a square waveform as shown in FIG. 14. This construction deviates from the control circuit shown in FIG. 11 in that the pulse-forming network 30 is integrated with the capacitor bank 112. The capacitors C, $C_2, \ldots C_n$ of capacitor bank 112 are interconnected with several inductors $L_1, L_2 \ldots L_n$ to provide a pulse-forming network 130.

The PFN when not integrated with the capacitor bank can be serially connected to the output side of SCR 115, but then a separate PFN is needed for each SCR and corresponding deicing element or group. With the configuration illustrated in FIG. 11, a separate triggering circuit and SCR is employed for each deicing element or group of elements intended to be energized on demand, but only a single PFN is needed.

Pulse-forming networks are well known for use in radar and laser applications. Other pulse forming networks may be used to achieve output current waveforms which approximate a ramp, triangular or square wave form or other shapes for enhancing deicer action.

Circuits for generation of such output current waveforms are well known to those skilled in the art of electronic circuits. These circuits may be adapted for use in combination with the deicing apparatus of the present invention. The key criterion is to increase the rise time to peak current and to extend the peak current duration to achieve more effective deicing. The rise time to peak current should be at least about 0.05 milliseconds and duration of the peak current should be at least about 0.25 milliseconds for a square waveform such as that shown in FIG. 14.

Deicing apparatus according to the present invention is much less sensitive to the relative alignment of the electrically conductive members of the overlying layers forming a deicing unit as compared to prior art construction according to U.S. Pat. No. 4,690,353. This is true in regard to all embodiments of the present invention. The four-layer construction of the present invention also provides much greater electroexpulsive force when the initial separation between the electrically conductive members having antiparallel currents flowing therein is greater, e.g., about 0.039 inches, when compared to the serpentine flat ribbon construction taught by the prior art, as shown in FIG. 10.

The separation system of this invention can be installed on aircraft structural members at the time of initial aircraft fabrication. Modular units exemplified in FIGS. 8a and 8b and FIGS. 9a and 9b can be added to the existing aircraft in the field. As shown in FIG. 7, the leading edge 71 surface of airfoil 72 can be recessed by design an amount comparable to the thickness of the deicer unit 70 so as to preserve the desired original airfoil configuration. The deicer unit is preferably adhesively mounted to the structural member surfaces, thus facilitating field installation and replacement.

In certain preferred embodiments of the present invention where high modulus dielectric plastic film is utilized to electrically insulate and mount the layers of parallel electrical conductive members such as for application to an engine intake or other compound curved surface, the high modulus, relatively rigid as compared to rubber and the like, dielectric film is cut into a plurality of narrow strips which are laid up on a curved form corresponding to the shape of the airfoil to which the deicer will be mounted.

Figure 15:
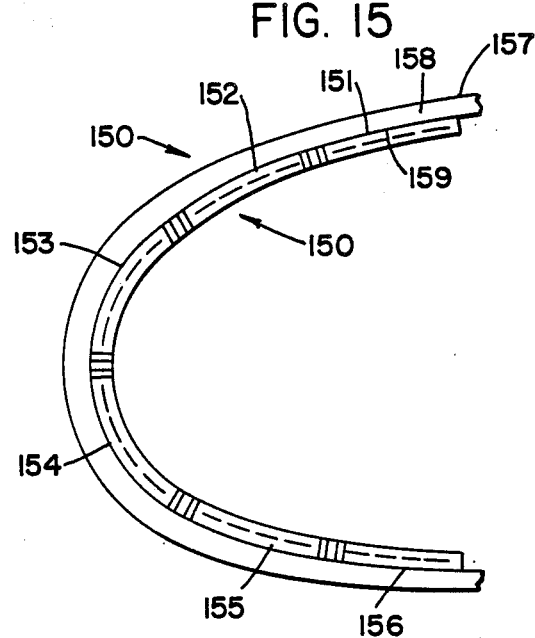
FIG. 15 is a fragmentary sectional view of an airfoil having secured to the obverse side of its outer skin a plurality of deicing apparatuses according to the present invention.

As shown in FIG. 15, a deicer pad 150 comprising a plurality of electroexpulsive units 151, 152, 153, 154, 155, 156, according to the invention may also be mounted to the obverse side 159 of the skin of an airfoil 158. No rigid backing support is needed in order to obtain effective deicing of the outer ice-accreting surface 157 of the skin of the airfoil. This surprising result is possible due to the rapid acceleration generated when the large current pulse is passed through the device which includes a plurality of relatively small electroexpulsive elements. The forces which tend to separate the layers of electrical conductors along their central separation surface or cavity act equally and oppositely about that center separation surface. Thus, no rigid backing member or base is needed in order to generate a force and cause acceleration of the outer ice accreting surface.

Figure 16:
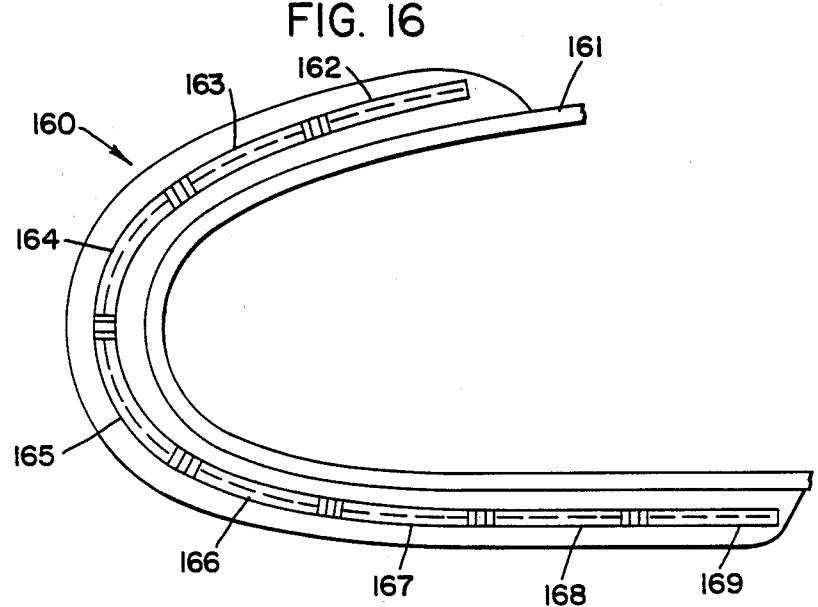
FIG. 16 is a fragmentary sectional view of an airfoil having a deicer unit according to the present invention secured to the outer surface of the airfoil.

FIG. 16 shows a deicer unit 160 which includes a plurality of relatively small electroexpulsive elements 162, 163, 164, 165, 166, 167, 168, 169. Deicer unit 160 is secured to the exterior surface of airfoil 161. The electrical conductors of the individual electroexpulsive units may extend spanwise or chordwise or at an oblique angle to the spanwise direction.

The deicing apparatus may also be built into a leading edge structure having a structural backing to provide effective deicing of the outer ice accreting surface. An airfoil having a deicing apparatus according to the invention and including titanium foil skin has been successfully tested in a wind tunnel. The electroexpulsive element need not cover the entire area to be de-iced because it is effective over an area larger than the element itself.

MANUFACTURE

Deicing apparatus according to the present invention is manufactured with use of a building form corresponding to the airfoil to be fitted with the electroexpulsive deicing apparatus, preferably a female form.

When a female form is employed, the deicer apparatus is built from the outside layer on which ice will accrete inwardly to the base layer which will be joined to the airfoil.

Manufacture of an embodiment similar to that shown in FIG. 8 is as follows. Outer layer 90 of suitable dimensions is placed into the female mold that has previously been provided with a layer of mold release fabric or otherwise treated to assist in release of the heat cured assembly from the mold. Where the outer skin is to be formed of metal or high modulus plastic, the inner surface of such outer skin layer is treated to ensure adhesion to the extensible fabric layer 89 next laid into the mold. The fabric employed for layer 89 may be of any suitable or conventional nature and is typically knit, woven, or non-woven of nylon cord, treated with adhesive and coated with elastomeric or plastic compound to provide reinforcement to the deicing apparatus and adhesively bond to contiguous layers. Other fabric materials such as polyester, rayon, aramid, acrylic and the like may be used. The elastomeric or plastic compound can be of any suitable or conventional nature such as natural or synthetic rubbers and elastomers, especially polyurethanes, and resilient, fatigue resistant plastics such as epoxies, phenolics and the like, thermoplastic or thermoset in nature, as these terms are known to those skilled in the art, and useful mixtures thereof, all as suitable for bonding to the contiguous layers of the deicer apparatus being constructed. As an alternative, a fiber reinforced layer (not illustrated in FIG. 8) may be used in place of outer layer 90 and fabric layer 89.

The electroexpulsive element is preferably pre-assembled prior to being built into the deicer apparatus under construction. For the two conductive layer element shown in FIG. 8, strips of flat braided multifilament copper wire having a width of 0.125 inch and a thickness of 0.020 inch were secured with adhesive at 0.225 inch center-to-center spacing on three mil thick polyimide film. A second layer of three mil polyimide film was placed on top of the wires. The film layers were previously treated with commercially available epoxy adhesive to promote adhesion of the film to itself. The pre-assembly was then folded back on itself and the ends of the electrical conductors protruding beyond the dielectric film were joined as shown in FIG. 2 by soldering or brazing. Electrical lead wires were then attached to the remaining pair of conductors. The pre-assembly may be pre-cured with heat and pressure or vacuum to remove any trapped air and to bond the conductors into their desired arrays. Where a vacuum conduit is deemed necessary to prevent unwanted distention due to air flow over the airfoil when in service, provision for later addition of a conduit port is made at this time.

The completed electroexpulsive element pre-assembly is then placed in contact with fabric-reinforced layer 89 in the mold. The pre-assembly is preferably adhered to the fabric layers surrounding it, but this is not required if other means such as edge bonding are provided to maintain alignment of the conductors when the deicer apparatus is in service.

The inner fabric layer 88 is thereafter laid into the deicer apparatus being constructed. Generally, the inner fabric layer may be formed of and treated with the same materials used for outer fabric layer 89. Fabric layer 88 need not be extensible to the extent required for layer 89 but where a deicer apparatus having compound curved surfaces is being constructed, such as for a nacelle, fabric layer 88 is also extensible to enable it to readily conform to the desired compound curved surface of the mold.

The inner layer 87 of any rubber, elastomer, plastic or other material suitable for bonding the completed deicer assembly to its intended airfoil is then applied to complete construction of the deicer apparatus which is thereafter cured in an autoclave to bond its components into a unit.

As an alternative, a single fiber-reinforced bond layer (not illustrated in FIG. 8) may be substituted for fabric layer 88 and inner layer 87.

In one electrical control circuit system made in accordance with the invention, like that diagrammatically shown in FIG. 11, eight Sprague Electric Company Type 681P metallized energy storage capacitors of 80 microfarad, 1360 Amperes peak, 1500 working volts D.C. were employed for the energy storage bank. A Westinghouse T700 series phase control SCR rated at 7000 amperes peak, 2200 volts D.C. peak was employed for discharge of the energy storage bank. The pulse forming network utilized a helically wound air-core inductor of 14 microhenries, 5000 volts D.C., made by Williamson Windings to produce the output current waveform shown in FIG. 12 characteristic of a damped RLC circuit. A saturable core inductor manufactured by Renco Electronics, Inc. having an inductance of 100 microhenries when substituted for the air-core inductor resulted in near identical output current magnitude and waveform. A high voltage power supply of conventional design and construction capable of producing from 850 volts D.C. to 1500 volts D.C. was employed to charge the capacitor bank, with nominal operation at 1250 volts D.C. When used in combination with embodiments of deicing apparatus according to the present invention having four layers of electrical conductors each of 0.125 inch width and 0.020 inch thickness and a lateral gap of 0.100 inch between conductors in the same layer, a vertical spacing of 0.008 inch between conductors of adjacent layers when not energized, a pulse current peak magnitude of from about 2300 amperes to about 3100 amperes was found to effectively remove ice formed in a wind tunnel and inflight testing on two different aircraft.

While construction parameters such as conductor type, width, thickness, lateral and vertical spacing, dielectric film type and thickness were held constant for the purpose of generating the comparative data graphically presented in FIG. 10, enhanced performance in a two conductor layer embodiment of the invention is possible. For example, when 0.094 inch wide conductors are arranged in each sheet-like array side-by-side on three mil polyimide film with a lateral gap of 0.050 inch between adjacent conductors, force per unit area equal to that obtained by the four conductor layer embodiment was observed when peak current was increased about twenty-five percent.

Although the invention has been described with reference to certain preferred embodiments, including the best embodiments, it would apparent to people skilled in the art of deicing of aircraft that other variations are possible which are obvious thereover. These variations are intended to be included by the present specification and appended claims. Four superposed layers of electrically conductive members appears to be optimum with presently available materials. A greater number of superposed layers of electrically conductive members could be employed for even greater electroexpulsive separation force at a given current. However, applicants believe that with materials presently available to them, a number of layers greater than four provides diminishing performance returns due to the increase in thickness and weight associated therewith. While in the figures of the drawing the electrically conductive members have been shown to overlie those of the adjacent layer in a perfect registration when observed in plan view, due to the more effective coupling of the electromagnetic fields in embodiments of the present invention, such precision, while desired, is not necessary to obtain effective operation in contrast to the prior art. Each electrically conductive member of any given layer need not have a corresponding overlapped or opposed conductor in an adjoining layer. Where a ribbon conductor is employed, it need not be made from a single piece of material but rather may be comprised of many electrically joined conductive sections, braided wires, etc. Elastomeric material could be substituted for the preferred nonelastomeric dielectic plastic film which is used to mount or embed and electrically isolate the layers of parallel electrically conductive members. Elastomeric material could be substituted for the preferred high modulus plastic or metal outer skin.

What is claimed is:

1. Deicing apparatus comprising a first sheet-like array of a plurality of first electrically conductive members electrically insulated from one another in parallel spaced-apart relationship,
    and a second sheet-like array of a plurality of second electrically conductive members electrically insulated from one another in parallel spaced-apart relationship,
    said electrically conductive members being electrically interconnected so that any electrical current flowing in the electrically conductive members flows in the same direction in adjacent first electrically conductive members and also flows in adjacent second electrically conductive members in a direction opposite to the flow in said first electrically conductive members, thereby producing an electroexpulsive separation force between said first and second electrically conductive members which produces a separation between said first and second electrically conductive members,
    said first sheet-like array being coextensive with and superposed proximate to said second sheet-like array so that said first and second electrically conductive members are substantially parallel.

2. Apparatus of claim 1 wherein said first and second sheet-like arrays are secured to sheet-like insulating members that are joined at their edges.

3. Apparatus of claim 1 wherein at least one of said first and said second electrically conductive members are ribbon-shaped.

4. Apparatus of claim 1 wherein each of said first electrically conductive members are positioned directly over corresponding ones of said second electrically conductive members.

5. Apparatus of claim 1 wherein said first electrically conductive members are offset laterally relative to said second electrically conductive members.

6. Apparatus of claim 1 wherein said first and said second electrically conductive members together define a flattened coil configuration.

7. Apparatus of claim 1 wherein the ribbon-shaped conductors are each of multifilament braided construction.

8. Apparatus of claim 1 wherein at least one of said first and said second electrically conductive members are formed from a thin metallic sheet.

9. Apparatus of claim 1 wherein the electrically conductive members are electrically insulated from one another by a sheet-like insulating member formed of polyimide.

10. The apparatus of claim 1 further including a third sheet-like array of a plurality of third electrically conductive members electrically insulated from one another in parallel spaced-apart relationship, said third sheet-like array overlying and in contact with said first sheet-like array, and a fourth sheet-like array of a plurality of fourth electrically conductive members electrically insulated from one another in parallel spaced-apart relationship, said fourth sheet-like array overlying and in contact with said second sheet-like array,
    said electrically conductive members of said third and fourth sheet-like arrays being electrically interconnected so that any electrical current flowing in said third electrically conducive members flows in the same direction as in said first electrically conductive members and also flows in said fourth electrically conductive members in the same direction as in said second electrically conductive members.

11. The apparatus of claim 10 wherein at least one of said first, second, third and fourth electrically conductive members are ribbon shaped.

12. The apparatus of claim 1 further including a third sheet-like array of a plurality of third electrically conductive members electrically insulated from one another in parallel spaced-apart relationship, said third sheet-like array overlying and in contact with said first sheet-like array, and a fourth sheet-like array of a plurality of fourth electrically conductive members electrically insulated from one another in parallel spaced-apart relationship, said fourth sheet-like array overlying and in contact with said second sheet-like array,
    said electrically conductive members of said third and fourth sheet-like arrays being electrically interconnected so that any electrical current flowing in said third electrically conductive members flows in a direction opposite to the flow in said first electrically conductive members and also flows in said fourth electrically conductive members a direction opposite to the flow in said second electrically conductive members.

13. The apparatus of claim 1 further including at least one additional sheet-like member having in spaced-apart relationship a plurality of additional, parallel, ribbon-shaped electrically conductive members, said additional sheet-like member being coextensive with and superposed proximate to one of said first and said second sheet-like arrays, said additional electrically conductive members being electrically interconnected so that any electrical current flowing in said additional electrically conductive members flows in the same direction in adjacent additional electrically conductive members-as it flows in the conductive members of the sheet-like array to which said additional sheet-like member is nearest.

14. Deicing apparatus comprising at least two upper and at least two lower superposed coextensive layers of electrically conductive members, each of said layers being proximate to an adjacent layer and electrically isolated from any adjacent layer, each of said layers having a plurality of parallel, closely spaced, electrically conductive members, the layers being arranged so that the electrically conductive members in all layers are substantially parallel and overlie one another, the electrically conductive members being interconnected so that any electrical current flowing in the corresponding proximate electrically conductive members of said upper layers flows in the same direction and also flows in corresponding proximate electrically conductive members of said lower layers in a direction opposite to the flow in the electrically conductive members of said upper layers, thereby producing an electroexpulsive separation force between said upper and said lower layers of electrically conductive members, which produces a separation between said first and second electrically conductive members, the layers being joined to define a unit.

15. The apparatus of claim 14 wherein the electrically conductive members are flat, metallic and ribbon-shaped and adjacent layers of electrically conductive members are electrically isolated by a dielectric film.

16. The apparatus of claim 15 wherein the film is a non-elastomeric high-modulus plastic.

17. The apparatus of claim 14 wherein the electrically conductive members are of flattened, braided, multifilament construction and adjacent layers are electrically isolated by polyimide film.

18. The apparatus of claim 1, further comprising an outer layer of erosion resistant material.

19. The apparatus of claim 10, further comprising an outer layer of erosion resistant material.

20. The apparatus of claim 14, further comprising an outer layer of erosion resistant material.

21. The apparatus of claim 18, further comprising a textile layer between said outer layer and said first sheet-like insulating member.

22. The apparatus of claim 19, further comprising a textile layer between said outer layer and said third sheet-like insulating member.

23. The apparatus of claim 20, further comprising a textile layer between said outer layer and the uppermost of said upper layers.

24. In combination, the apparatus of claim 1 and a leading edge, said first sheet-like insulating member being secured to the outer surface of the leading edge.

25. In combination, the apparatus of claim 10 and a leading edge, said third sheet-like insulating member being secured to the outer surface of the leading edge.

26. In combination, the apparatus of claim 14 and a leading edge, said unit being secured to the outer surface of the leading edge.

27. The apparatus of claim 18 in which the outer layer defines a leading edge.

28. The apparatus of claim 19 in which the outer layer defines a leading edge.

29. The apparatus of claim 20 in which the outer layer defines a leading edge.

30. In combination, at least first and second apparatuses according to claim 1 and a leading edge, said first and said second apparatuses being disposed rearwardly of the leading edge on opposite sides of the centerline thereof.

31. The combination of claim 30, further comprising a third apparatus according to claim 1 disposed between said first and said second apparatuses and overlapping the leading edge.

32. The combination of claim 30, further comprising a base layer secured to the outer surface of the leading edge, a center fillet adapted to be positioned on the centerline of the leading edge and an outer layer of erosion resistant material.

33. The combination of claim 32 further including an outer layer of erosion resistant material and textile layer between the outer layer and the apparatuses.

34. The combination of claim 32 wherein the combination is a modular preassembled unit.

35. The combination of claim 33 wherein the outer layer is formed of metal and the combination is a modular preassembled unit.

36. In combination, at least first and second apparatuses according to claim 10 and a leading edge, said first and second apparatuses being disposed rearwardly of the leading edge on opposite sides of the centerline thereof.

37. The combination of claim 36 further comprising a base layer secured to the leading edge, a center fillet secured to the base layer on the centerline of the leading edge between said first and second apparatuses, and an outer layer of erosion resistant material, the apparatuses, base layer, center fillet and outer layer being preassembled into a modular unit.

38. The combination of claim 37 wherein at least one of said outer layer and said base layer is reinforced with textile material.

39. The combination of claim 38 wherein the outer layer is formed of metal.

40. In combination, at least first and second apparatuses according to claim 14, and a leading edge, said first and second apparatuses being disposed rearwardly of the centerline of the leading edge on opposite sides thereof.

41. The combination of claim 40 further comprising a base layer secured to the leading edge, a center fillet secured to the base layer between said first and second apparatuses, and an outer layer of erosion resistant material, the apparatuses, base layer, center fillet and outer cover being preassembled into a modular unit.

42. The combination of claim 41 wherein at least one of said outer layer and said base layer is reinforced with textile material.

43. The combination of claim 42 wherein the outer layer is formed of metal.

44. The combination of claim 33 further including fibrous reinforcements extending in the direction of thickness of the combination and positioned between said first and second apparatuses.

45. The combination of claim 38, further including fibrous reinforcements extending in the direction of thickness of the combination and positioned between said first and second apparatuses.

46. The combination of claim 42, further including fibrous reinforcements extending in the direction of thickness of the combination and positioned between first and second apparatuses.

47. The apparatus of claim 1 further comprising electrical circuit means coupled to said conductive members, said circuit means generating large current pulses of predetermined magnitude, shape and duration.

48. The apparatus of claim 47 wherein said circuit means includes a pulse forming network which provides to said conductive members an overdamped, exponentially decaying sinusoidal current waveform which requires about 0.1 millisecond to rise to peak current.

49. The apparatus of claim 42 wherein said circuit means includes a pulse forming network which provides to said conductive members a current pulse approximating a square wave which requires at least about 0.05 millisecond to rise to peak current and at least about 0.25 millisecond duration at peak current.

50. Apparatus according to claim 48, producing an electroexpulsive separation force between said first and second electrically conductive members of at least 22 lbs. per square inch at a peak current not exceeding 2400 amperes.

51. Apparatus according to claim 10 further comprising electrical circuit means coupled to said conductive members, said circuit means generating large current pulses of predetermined magnitude, shape and duration.

52. Apparatus according to claim 51 wherein said circuit means includes a pulse forming network which provides to said conductive members an overdamped, exponentially decaying sinusoidal current waveform which requires about 0.1 millisecond to rise to peak current.

53. Apparatus according to claim 51 wherein said circuit means includes a pulse forming network which provides to said conductive members a current pulse approximating a square wave which requires at least about 0.05 millisecond to rise to peak current and at least about 0.25 millisecond duration at peak current.

54. Apparatus according to claim 52, producing an electroexpulsive separation force between said first and second electrically conductive members is at least 80 lbs. per square inch at a peak current not exceeding 2400 amperes.

55. Apparatus according to claim 14 further comprising electrical circuit means coupled to said conductive members, said circuit means generating large current pulses of predetermined magnitude, shape and duration.

56. Apparatus according to claim 55, wherein said circuit means includes a pulse forming network which provides to said conductive members an overdamped, exponentially decaying sinusoidal current waveform which requires at least about 0.1 millisecond to rise to peak current.

57. Apparatus according to claim 55 wherein said circuit means includes a pulse forming network which provides to said conductive members a current pulse approximating a square wave.

58. Apparatus according to claim 56 wherein producing an electroexpulsive separation force between said first and second electrically conductive members of at least 80 lbs. per square inch at a peak current not exceeding 2400 amperes.

59. Apparatus according to claim 18 in which the outer layer has a modulus of elasticity of at least 275,000 kPa.

60. Apparatus according to claim 19 in which the outer layer has a modulus of elasticity of at least 275,000 kPa.

61. Apparatus according to claim 20 in which the outer layer has a modulus of elasticity of at least 275,000 kPa.

62. Apparatus according to claim 18 wherein the outer layer is formed of metal selected from the group consisting of titanium and its alloys, aluminum and its alloys, magnesium and its alloys, and stainless steels.

63. Apparatus according to claim 19 wherein the outer layer is formed of metal selected from the group consisting of titanium and its alloys, aluminum and its alloys, magnesium and its alloys, and stainless steels.

64. Apparatus according to claim 20 wherein the outer layer is formed of metal selected from the group consisting of titanium and its alloys, aluminum and its alloys, magnesium and its alloys, and stainless steels.

65. In combination, apparatus according to claim 1 and a leading edge, the apparatus being secured to the obverse surface of the leading edge.

66. In combination, apparatus according to claim 10 and a leading edge, the apparatus being secured to the obverse surface of the leading edge.

67. In combination, apparatus according to claim 14 and a leading edge, the apparatus being secured to the obverse surface of the leading edge.

68. A modular deicing unit comprising an outer layer of erosion resistant material and at least first and second apparatuses according to claim 1 secured to an inner layer adapted to be secured to the outer surface of a leading edge.

69. The modular unit of claim 68 wherein at least one of said inner layer and said outer layer is reinforced with textile fabric.

70. A modular deicing unit comprising an outer layer of erosion resistant material and at least first and second apparatuses according to claim 10 secured to an inner layer adapted to be secured to the outer surface of a leading edge.

71. The modular unit of claim 70 wherein at least one of said inner layer and said outer layer is reinforced with textile fabric.

72. A modular deicing unit comprising an outer layer of erosion resistant material and at least first and second apparatuses according to claim 14 secured to an inner layer adapted to be secured to the outer surface of a leading edge.

73. The modular unit of claim 72 wherein at least one of said inner layer and said outer layer is reinforced with textile fabric.

74. In combination, a modular deicing unit according to claim 68 and a power supply cable having a plurality of separate, central, insulated electrical feed conductors respectively coupled to corresponding apparatuses of said unit and an electrically conductive shield surrounding said plurality of feed conductors and electrically joined to said apparatuses for return of current fed through said feed conductors.

75. The combination of claim 74 further including a pulse forming network electrically joined to the power supply cable to provide current pulses of predetermined magnitude, shape and duration to the apparatuses.

* * * * *